United States Patent [19]
Fernandez et al.

[11] Patent Number: 5,602,460
[45] Date of Patent: *Feb. 11, 1997

[54] OVERCHARGE CURRENT PROTECTION CIRCUIT AND BATTERY PACK USING SAME

[75] Inventors: Jose M. Fernandez, Lawrenceville; Vernon Meadows, Lilburn; Erika D. Mack, Duluth; Iilonga P. Thandiwe, Atlanta, all of Ga.

[73] Assignee: Motorola, Inc., Schaumburg, Ill.

[*] Notice: The term of this patent shall not extend beyond the expiration date of Pat. No. 5,518,832.

[21] Appl. No.: 430,669

[22] Filed: Apr. 28, 1995

[51] Int. Cl.⁶ .................................................. H02J 7/04
[52] U.S. Cl. .............................................. 320/30; 320/35
[58] Field of Search ................................... 320/5, 27–30, 320/39–40, 35, 13; 429/7, 9

[56] References Cited

U.S. PATENT DOCUMENTS 5,518,832  5/1996  Fernandez et al. .................. 429/29

Primary Examiner—Peter S. Wong
Assistant Examiner—Gregory J. Toatley, Jr.
Attorney, Agent, or Firm—Kenneth M. Massaroni; Scott M. Garrett

[57] ABSTRACT

A battery pack (62) comprises cells (74), and is charged by a charger (64) providing a current level. The charger (64) is a typical nickel-cadmium battery charger providing a first charge current level in excess of an optimum charge current level. The battery pack (62) further comprises a thermal sensing element (76) and an overcurrent charge protection circuit having an overcurrent switch (78), current sense circuit (80), comparator circuit (82), and temperature signal switch (84). If the current level through the cells (74) exceeds the optimum charge current level, the current sense circuit (80) provides a signal to comparator circuit (82) which actuates the temperature signal switch (84), simulating a hot battery pack. The charger (64) then switches to a second charge current level which does not exceed the optimum charge current level. If the charger (64) does not change current levels, a switch delay (86), after a brief period, accumulates enough voltage to actuate a driver switch (88) which opens the overcurrent switch (78), disconnecting the cells (74) from the charger (64).

26 Claims, 2 Drawing Sheets

OVERCHARGE CURRENT PROTECTION CIRCUIT AND BATTERY PACK USING SAME

CROSS REFERENCE TO RELATED APPLICATIONS

This application is related to co-pending applications, U.S. Ser. No. 08/364,582, filed Dec. 27, 1994, entitled "Apparatus and Method of Simulating High Battery Temperature In A Rechargeable Battery", U.S. Ser. No. 08/364,583, filed Dec. 27, 1994 and entitled "Apparatus For Simulating High Battery Temperature For Rechargeable Battery Systems", U.S. Ser. No. 08/357,891 filed Dec. 16, 1994 entitled "Apparatus and Method of Providing an Initiation Voltage To A Rechargeable Battery System", and U.S. Ser. No. 08/370,053, filed Jan. 9, 1995 entitled "Apparatus For Simulating High Battery Temperature Used In Recharging Lithium Ion Cells" and all assigned to Motorola, Inc.

TECHNICAL FIELD

This invention relates in general to battery recharging and more particularly to systems for rechargeable battery cells.

BACKGROUND

An increasing number of portable electronic products are available today which operate on a battery source powering the device. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, enables a cell to be recharged while offering many advantages over other types of rechargeable cells. These benefits primarily are directed to low weight and overall size with a high energy density. One unique factor to be considered when using a lithium ion cell is its charging scheme. A lithium ion cell is not charged in the same manner as cells using a nickel chemistry.

Nickel-cadmium and nickel metal hydride cells are typically charged using a rapid charge by applying a constant current until a certain event occurs. This event may be coupled to the cell reaching a predetermined high voltage, decreasing to a predetermined low voltage, or an increase in the cell's temperature. This is in contrast with the lithium ion cell which requires a two step charging process to achieve optimum performance. The first step of this process provides that the battery charger apply a constant current level while the cell's voltage remains below a predetermined threshold. Once the voltage increases to that threshold, the second step insures the battery charger is held at the threshold voltage allowing the current to decrease. Once the current decreases sufficiently to a desired level, the lithium ion cell is fully recharged.

This two step process presents a problem when considering charging lithium ion cells in a charger designed for nickel systems. Generally, nickel system chargers apply only a constant current which allows the voltage of the cells to rise unimpeded. The voltage may rise to any level provided the battery does not become too hot, i.e. increase to a undesired and dangerous level. Once the nickel system battery becomes hot, the charger detects this state and switches from the rapid high current charge to a value of approximately 5–10% that of the rapid current value.

Certain lithium ion cells are sensitive to current levels, and cannot be charged at the full rate typically provided by a nickel system charger. Accordingly, battery packs using such cells, or similar types, could not be made retrofittable in the absence of a means by which to control the charging current. One way to accomplish this is to have the charger change modes quickly, so that it only charges at the initial high rate for a brief period, and then switches to the lower current mode. This lower current mode is generally referred to as a trickle current or trickle charge, and is acceptable for charging smaller capacity lithium ion cells sensitive to overcurrent conditions.

Hence, the charging scheme offered by current nickel system chargers will not properly charge a lithium ion cell. Should a lithium ion cell be placed or forced into the nickel system charger the result could be potentially damaging since the lithium ion cell could quickly overheat.

Therefore, the need exists for a battery charging circuit or system which can be retrofitted to the control circuitry of an existing lithium ion cell allowing the cell to safely use a nickel system charger such that the charger does not provide an excessive current level for any extended period of time.

DETAILED DESCRIPTION OF THE PREFERRED EMBODIMENT

Figure 1:
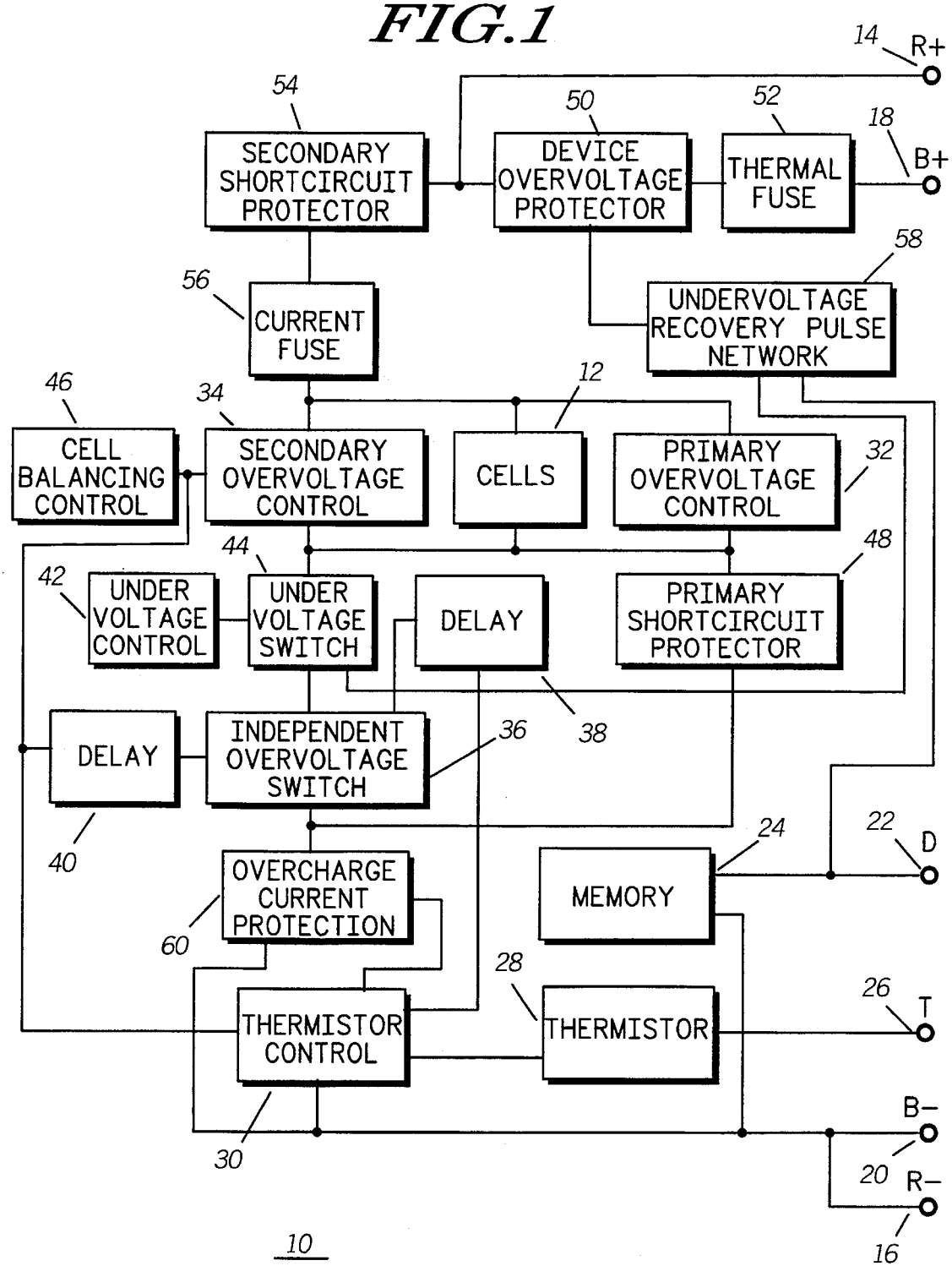
FIG. 1 is a block diagram showing operation of a retrofittable charging and safety system used with a lithium ion cell in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a block diagram of a lithium ion battery safety and control circuit platform or battery system 10. This system has been developed for use in future lithium ion batteries, as well as a retrofit for batteries currently in use. The system is intended to accommodate various user and manufacture recommendations for providing a useful and safe lithium ion battery system that can be charged with an existing charger designed only for nickel battery systems. A more thorough description is provided in U.S. patent application Ser. No. 08/364,583 filed Dec. 27, 1994 in the names of Fernandez, et al and entitled Apparatus for Simulating High Battery Temperature for Rechargeable Battery Systems, the disclosure of which is hereby incorporated by reference.

The battery system 10 is for use with a portable electronic device and includes protection circuitry for one of more cells 12. Cells 12 are generally lithium ion or the like and provide a voltage potential at operating terminals 14 and 16. Operating terminals 14, 16 are used to supply an operating voltage to a portable product (not shown) which uses battery system 10 for a power source. The system further includes charging terminals 18, 20 which are used to receive a charging voltage which is applied to recharge cells 12. A data terminal 22 supplies information to a charging system from a memory 24. Memory 24 is a ROM type memory or the like and conveys information to those types of chargers known as "smart chargers". This information relates to the battery type and charging regime which a charging system would be required to know before recharging the battery. Finally, a temperature terminal 26 is used to allow the charging system to detect the temperature of the battery during recharging. This is accomplished through the use of a thermistor 28, which is preferably a negative temperature coefficient (NTC) type or like device which permits measurement by the charging system of an accurate battery temperature during the recharging process. A thermistor control 30 is attached to thermistor 28 and is controlled by primary over voltage control 32 and secondary over voltage control circuit 34 to change or redirect the current flow around thermistor 28. Thermistor control 30 is discussed in more detail in U.S. Ser. No. 08/364,582, filed Dec. 27, 1994, entitled "Apparatus and Method of Simulating High Battery Temperature In A Rechargeable Battery", the disclosure of which is hereby incorporated by reference, and in summary, has the effect of simulating a high, or otherwise undesirable temperature condition of cells 12. This condition is subsequently detected by an attached charging system (not shown) allowing it to alter its charging mode of operation from a fast charge to a slower or trickle charge.

Primary overvoltage control 32 is connected with cells 12 and is used to measure the cumulative voltage present on the cells 12 to prevent the cells from increasing or rising above a selected voltage. In the event primary overvoltage control 32 fails or becomes inoperative, secondary over voltage control 34 is used to measure the voltage on each individual cell and prevent each individual cell from increasing or rising above a selected voltage. Upon actuation of either primary over voltage control 32 or secondary over voltage control 34, a control signal is supplied to one or more independent over voltage switches 36. Actuation of any one of independent over voltage switches 36 provides an open circuit which disconnects cells 12 from operating terminals 14, 16. Each control signal is delayed using a delay 38 or delay 40 respectively which delays the control signal before actuating any of independent over voltage switches 36. The delay 38, 40 is used to insure thermistor control 30 receives its control signal before independent over voltage switches 36 are enabled which would disconnect the charge current from cells 12. This allows an attached charging system to detect simulated changes in the temperature of cells 12 and alter its mode of operation before actuation of any of independent over voltage switches 36. Similarly, under voltage control 42 is used to measure the cumulative voltage of cells 12 and provides a control signal to under voltage switch 44 when the cumulative voltage drops below a predetermined level. Like independent over voltage switches 36, under voltage switch 44 is connected serially with cells 12 and disconnects cells 12 when the voltage of the cells drops to an undesirably low level to prevent damage to cells 12.

Cell balancing control 46 is comprised of a load (not shown) connected in parallel with each of cells 12. Cell balancing control 46 acts to switch the load across a cell in order to maintain each of the cells at approximately the same voltage level during charging. The load is used to slightly discharge a single cell in the event the cell becomes a slightly higher voltage as compared with other cells. The load is disconnected once the cell voltage has been reduced to a level compatible with other cells.

Primary short circuit protector 48 is used to measure the voltage across both independent over voltage switches 36 and under voltage switch 44. Since these switches inherently have a small stable DC resistance, the voltage across them is proportion to the current which runs through them when cells 12 are being recharged. In response to a selected voltage drop across independent over voltage switches 36 and under voltage switch 44 corresponding to an excessive current level, primary short circuit protector 48 provides a control signal to under voltage switch 44. This insures the under voltage switch 44 disconnects cells 12 from terminals 14l6 to prevents any further discharge until the excessive high current conditions removed. This acts as a safety feature to prevent cells 12 from generating excessive heat and possible damage under extremely high load conditions.

Electronic device over voltage protector 50 is connected serially with cells 12 and charging terminal 18 and is used to determine when any of independent over voltage switches 36 have been actuated. Since actuation of these switches may cause the operational battery pack voltage to increase or rise to a level which could damage electronic equipment attached to the battery system 10 at operating terminals 14, 16, electronic device over voltage protector 50 detects actuation of independent over voltage switches 36 and in response thereto, disconnects operating terminal 14, from charging terminal 18 to prevent an attached charger from supplying a potentially damaging voltage to an electronic device attached to operating terminal 14. Alternatively, if electronic device over voltage protector 50 is not used, a thermal fuse 52 may be implemented. Thermal fuse 52 is also attached serially between cells 12 and charging terminal 18 and generally includes a high power zener diode (not shown) or the like. The zener diode acts to shunt current when voltage across operating terminal 14, 16 reaches a selected voltage since this would likely damage an electronic device attached to operating terminal 14. As current is shunted around cells 12 and over voltage switch 36, the zener diode begins to heat. The zener diode is thermally coupled to the serially connected thermal fuse which opens and disconnects the battery from the charging terminals 18, 20 once sufficiently heated.

A secondary short circuit protector 54 acts as a current detection element and is also connected in series between cells 12 and operating terminal 14 and charging terminal 18. Secondary short circuit protector 54 may be a polyswitch or the like and is used to detect excessive current which may not be detected by either primary short circuit protector 48 or overcharge current protector 60, described below. A current fuse 56 also acts as a current detection element and is placed in series between cells 12 and operating terminal 14 and charging terminal 18 and is used as a last resort or ultimate backup in the event of a catastrophic failure in which current rises to an unacceptable level. The fuse is generally located close to cells 12 to minimize runner length. The current fuse 56 is preferably a slow acting type so as not to interfere with other current protection systems with lithium ion battery system 10.

Under voltage recovery pulse network 58 is used in the event that any one of independent over voltage switches 36 have been actuated and cells 12 are no longer connected to charging terminal 18. Under these conditions, when the battery is initially connected to a charging system (not shown), the charging system first detects a voltage present on charging terminals 18, 20. If no voltage is present, the charging system determines that no battery is connected to it and does not provide a charging voltage to operating terminals 14, 16. When the battery is initially connected however, an initial pulse of a predetermined voltage and amplitude is supplied from the charging system to data terminal 22. This pulse is detected by under voltage recovery pulse network 58 which utilizes the voltage to restore operation of independent over voltage switches 36. Once operation of independent over voltage switches 36 is restored, the appropriate switch is closed which restores continuity between cells 12 and charging terminal 18 through electronic device over voltage protector 50. Thus, the voltage of cells 12 is restored in a time fast enough that a charging system will detect this voltage on operating terminals 14, 16 even when a battery system 10 is disabled, and cells 12 disconnected due to some event which has occurred. The charging system will recognize the voltage on charging terminals 18, 20 and begin a charging cycle by applying a charging voltage to these terminals.

Overcharge current protector 60 is a complement to primary short circuit protector 48 by directly measuring the amount of current through it. If the current reaches a selected level, a control signal is generated by overcharge current protector 60 to independent over voltage switches 36 which disconnects cells 12 from terminals 14–16. Additionally, overcharge current protector 60 is used to limit the charge current. Since cells 12 are a lithium ion type cell and may be used with a charger designed to provide a charging regimen for nickel chemistry cells, it may be initially charged at a first charge current level in excess of the optimum charge current level for a lithium ion cell. In this case, overcharge current protector 60 will detect this high current level and provide a control signal to thermistor control 30 to simulate an undesirable temperature condition. This "tricks" the nickel system charger and forces it to change to a second charge current level, commonly referred to as trickle charge mode, which does not exceed the optimum charge current level, and is more suited for the lithium ion cell.

Figure 2:
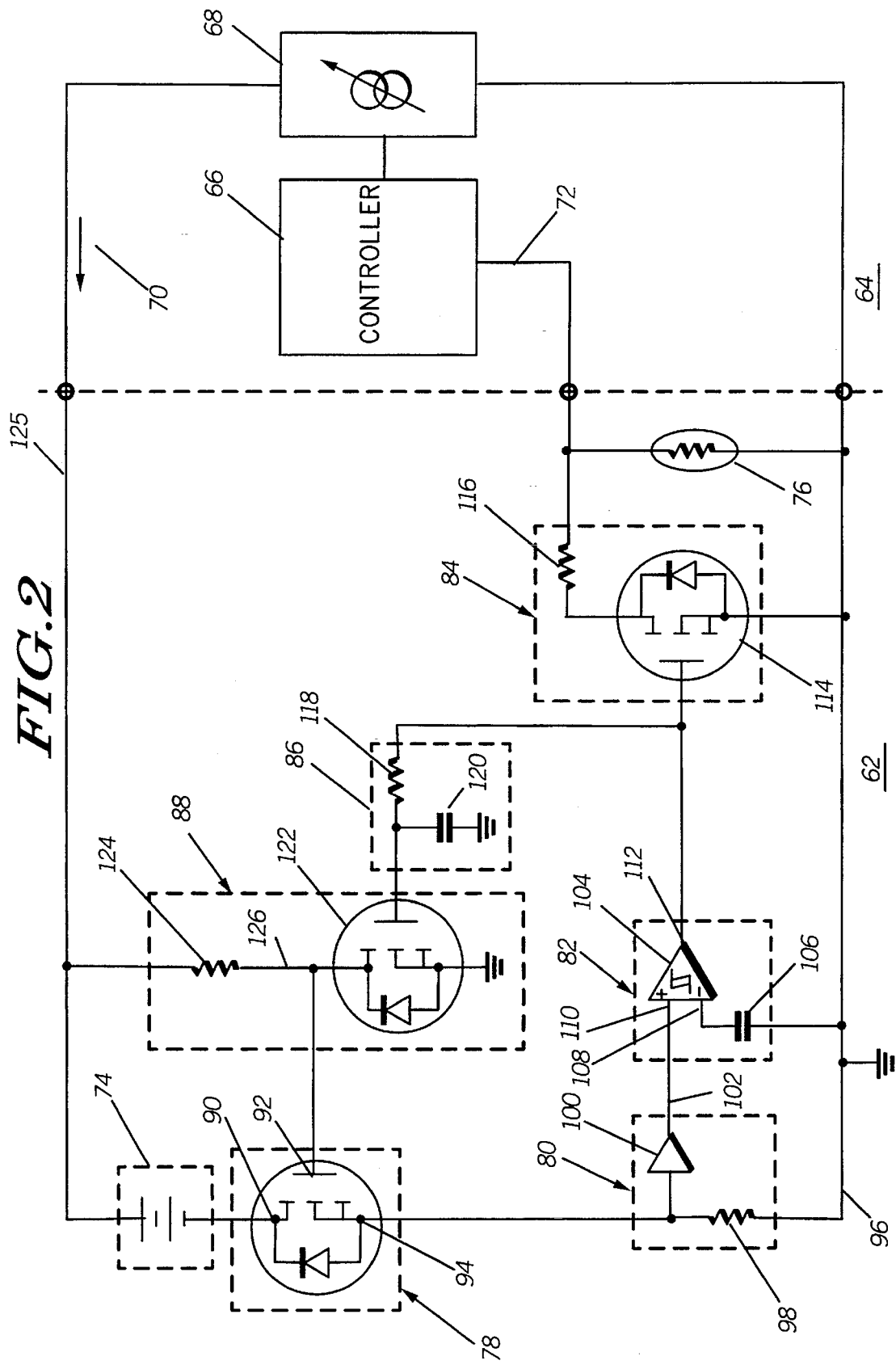
FIG. 2 is a partial schematic diagram in accordance with a preferred embodiment of the invention showing an overcharge current protection circuit.

Referring now to FIG. 2, a partial schematic diagram illustrating a battery pack 62, having an overcharge current protection circuit, connected to a charger 64 in accordance with a preferred embodiment of the invention. Circuitry not involved with the overcharge current protection function that is preferably included in a retrofittable lithium ion type battery system has been removed for clarity. Charger 64 comprises charger controller 66 which controls the functions and output of charger 64, and variable power source 68 which is responsive to charger controller 66, and provides an initial charge current rate C1, and is switchable to a lower rate C2, both in the direction of arrow 70. The charger controller 66 determines the level of current in the direction of arrow 70 to provide based, in part, on temperature information received on line 72, which is coupled to the battery pack 62. The battery pack 62 comprises battery cells 74 which includes at least one battery cell, temperature sensing element 76, overcurrent switch 78, current sense circuit 80, comparator circuit 82, temperature signal switch means 84, switch delay 86, and driver switch 88. Battery cells 74 are of a lithium ion type, and are connected such that any applied charge current flows through them. Battery cells 74 optimally should not be charged at a current rate above rate C3, where C2<C3<C1, i.e. rate C1, the initial charge current rate provided by charger 64 is greater than the optimum rate C3 of battery cells 74, but lower rate C2 of charger 64 does not exceed optimum charge rate C3. This system is typical of most rapid nickel system battery chargers; they provide an initial rapid rate, and switch to a rate of 1/20th to 1/10th of the initial rate when some event occurs, such as battery temperature rise.

Overcurrent switch 78 is a semiconductor switch connected in series between battery cells 74 and current sense circuit 80, and is preferably a N-channel type MOSFET although it is contemplated that various other types of semiconductor switches could perform a similar switching function. Overcurrent switch 78 is connected with, and responsive to, driver switch 88, and is normally closed to allow conduction of current through battery cells 74. The preferred MOSFET embodiment provides three terminals; drain 90 connected to battery cells 74, gate 92 connected to driver switch 88, and source 94 connected to current sense circuit 80.

Current sense circuit 80 is connected in series between overcurrent switch 78 and the charge current return line 96. It provides a means to convert the charge current through battery cells 74 to a low level voltage signal, and then amplifies the low level voltage signal to provide an output signal. It comprises current sense resistor 98, and amplifier 100. Current provided by charger 64 flows through current sense resistor 98 to provide the low voltage signal. The value of current sense resistor is low, preferably 0.1 ohm or less, to minimize loss. The voltage produced across current sense resistor 98 is fed to amplifier 100. Amplifier 100 is preferably an op-amp connected in a non-inverting configuration, as is well known in the art, and has an amplifier output connected to line 102. The amplifier output provides a voltage level proportional to the low voltage signal provided by current sense resistor 98 multiplied by a preselected gain factor. The amplified signal is fed to comparator circuit 82 via line 102.

Comparator circuit 82 comprises a comparator 104 and a voltage reference 106. Voltage reference 106 is connected between the inverting input 108 and charge current return line or negative charging terminal 96, and provides a reference voltage level. Non-inverting input 110 is fed the output of the current sense circuit 80 via line 102. Comparator output 112 is normally "off", that is, at a very low potential, close to the potential of charge current return line 96. When the potential at non-inverting input 110 exceeds the potential at inverting input 108, i.e. the reference voltage level, comparator output 112 switches to an "on" level which is equal to, or slightly less than the highest potential available in battery pack 62. The voltage at comparator output 112 is fed to both temperature signal switch means 84 and switch delay 86.

Temperature signal switch means 84 comprises a resistive switch element coupled parallel to the temperature sensing element 76, which is preferably an NTC thermistor. Preferably, a switch element 114 is coupled in series with a current limiting resistor 116. Switch element 114 is preferably a N-channel type MOSFET. Current limiting resistor 116 limits the current that can be drawn though switch element 114, but is low enough in value such that when switch element 114 is actuated, the effective resistance apparent on line 72 looking into battery pack 62 corresponds to an undesirable temperature, as would be indicated by temperature sensing element 76 if switching element 114 were not actuated. Such would be the case if battery cells 74 reached an unchargeably high temperature. However, current limiting resistor 116 is only required if, as is the case on some chargers, a very low potential on line 72 causes the charger to enter a test mode. In other embodiments current limiting resistor 116 is unnecessary.

Switch delay 86 and driver switch 88 work together to actuate overcurrent switch 78 at the appropriate time. As discussed previously, the output voltage of comparator circuit 82 is fed to switch delay 86. Switch delay 86 comprises a series resistor 118 and a shunt capacitor 120, which form what is commonly referred to as an RC filter. In a steady state condition, the voltage on either side of series resistor 118 is the same. When the input voltage level changes, i.e. the output of the comparator circuit, the shunt capacitor 120 begins charging or discharging, depending on the change, at a rate limited by the series resistor 118. Driver switch 88 is comprised of driver switch element 122 and pull up resistor 124 coupled in series between the positive charging terminal 125 and line 96, and form midpoint node 126 where the two are connected to each other. Driver switch element 122 is preferably a N-channel MOSFET and is controlled by the voltage across shunt capacitor 120. The voltage at midpoint node 126 is fed to overcurrent switch 78, and is normally equal to the potential of the positive battery terminal since driver switch element 122 is normally open.

An understanding of how the elements of the battery overcharge current protection circuit can be appreciated from the following description. Battery pack 62 is connected to charger 64 and is detected by charger 64. Accordingly, charger 64 begins delivering a current in the direction of arrow 70 which is at a level higher than an optimum level for battery cells 74. A voltage is produced across current sense resistor 98 which is amplified by amplifier 100 and fed to comparator circuit 82. The comparator circuit 82 compares the amplified signal to a reference voltage level provided by voltage reference 106. The gain of the current sense circuit 80 and the level of the reference voltage are such that the voltage fed to the comparator circuit by the current sense circuit equals the reference voltage level when the current provided by the charger 64 is equal to the maximum optimum current level.

When the charger current exceeds the maximum optimum current level, the output of the current sense circuit 80 exceeds the reference voltage level, and the output of the comparator circuit 82 switches to a high voltage level. It should be appreciated that current sense circuit 80 and comparator circuit 82 work in conjunction as a temperature signal switch control. The resulting high voltage level causes switching element 114 to close, switching current limiting resistor 116 virtually in parallel with temperature sensing element 76. The charger controller 66 detects a change of voltage on line 72, and interprets this to indicate that the battery has become unchargeably hot. Accordingly, charger controller 66 adjusts variable power source 68 to a much lower level, generally referred to as a trickle charge current. Once the charge current has been reduced, the current sense circuit 80 feeds a proportionately lower voltage signal to the comparator circuit 82, which is lower than the voltage level provided by voltage reference 106. This causes the output of comparator circuit 82 to drop back to a low level, allowing the battery cells to be charged at a more acceptable rate.

If for some reason charger 64 did not switch to a lower charge current rate, the output of comparator circuit 82 would remain high, and eventually the voltage across shunt capacitor 120 would reach a level sufficient to actuate driver switch element 122. When driver switch element 122 is actuated, or closed, the voltage on midpoint node 126 drops to a very low level, thus removing voltage from the gate 92 of overcurrent switch 78. Accordingly, overcurrent switch 78 opens, that is, becomes highly resistive, and thereby blocks any further current from flowing, effectively disconnecting battery cells 74 from charger 64.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack for use with a charger having a charge current level and providing a first charge current level in excess of an optimum charge current level and switchable to a second charge current level not exceeding said optimum charge current level upon indication of said battery pack reaching an undesirable temperature, said battery pack having a positive and a negative charging terminal, said battery pack comprising:

at least one battery cell through which charge current flows;

a temperature sensing element for sensing the temperature of said at least one battery cell and providing a signal to said charger indicating said temperature;

temperature signal switch means coupled parallel with said temperature sensing element for simulating an undesirable battery temperature to said charger when actuated; and temperature signal switch control means for sensing said charge current level and actuating said temperature signal switch means when said charge current level exceeds an optimum charge current level.

2. A battery pack as in claim 1, further comprising an overcurrent switch coupled in series with said at least one battery cell for disconnecting said at least one battery cell from said charger in response to said charger continuing to provide a charge current level in excess of said optimum charge current level after said temperature signal switch means is actuated.

3. A battery pack as in claim 2, wherein said overcurrent switch is responsive to a driver switch coupled to said temperature signal switch control means through a switch delay.

4. A battery pack as in claim 3 wherein said overcurrent switch comprises a MOSFET.

5. A battery pack as in claim 3 wherein said switch delay comprises a series resistor and a shunt capacitor.

6. A battery pack as in claim 3 wherein said driver switch comprises a MOSFET and a pull up resistor coupled in series between said positive charging terminal and said negative charging terminal.

7. A battery pack as in claim 1, wherein said temperature signal switch control means comprises:

a current sense circuit for providing a signal proportional to said charge current level through said at least one battery cell as an output signal; and a comparator circuit for comparing said signal provided by said current sense circuit with a reference voltage, said comparator circuit having an output coupled to said temperature signal switch means and providing an actuating signal if said signal provided by said current sense circuit is greater than said reference voltage.

8. A battery pack as in claim 7 wherein said current sense circuit comprises:

a current sense resistor connected in series with said at least one battery cell for producing a low level voltage signal proportional to said charge current level through said at least one battery cell; and an amplifier for amplifying said low level voltage signal by a preselected gain factor thereby providing an amplified signal to said comparator circuit.

9. A battery pack as in claim 8 wherein said amplifier is an op-amp connected in a non-inverting configuration.

10. A battery pack as in claim 7 wherein said comparator circuit comprises:

a comparator having an inverting input, non-inverting input, and a comparator output, said non-inverting input receiving said output signal of said current sense circuit; and a voltage reference connected between said inverting input of said comparator and said negative charging terminal.

11. A battery pack as in claim 1 wherein said temperature sensing element is a NTC thermistor.

12. A battery pack as in claim 1 wherein said temperature signal switch means comprises a MOSFET.

13. A battery pack as in claim 12 wherein said temperature signal switch means further comprises a current limiting resistor coupled in series with said MOSFET.

14. An overcharge current protection circuit for a battery pack having at least one battery cell for use with a charger having a charge current level and providing a first charge current level in excess of an optimum charge current level and switchable to a second charge current level not exceeding said optimum charge current level upon indication of said battery pack reaching an undesirable temperature, said battery pack having a positive and a negative charging terminal, said circuit comprising:

a temperature sensing element for sensing the temperature of said at least one battery cell and providing a signal to said charger indicating said temperature;

temperature signal switch means coupled parallel with said temperature sensing element for simulating an undesirable battery temperature to said charger when actuated; and temperature signal switch control means for sensing said charge current level and actuating said temperature signal switch means when said charge current level exceeds an optimum charge current level.

15. A battery pack as in claim 14, further comprising an overcurrent switch coupled in series with said at least one battery cell for disconnecting said at least one battery cell from said charger in response to said charger continuing to provide a charge current level in excess of said optimum charge current level after said temperature signal switch means is actuated.

16. A battery pack as in claim 15, wherein said overcurrent switch is responsive to a driver switch coupled to said temperature signal switch control means through a switch delay.

17. A battery pack as in claim 16 wherein said overcurrent switch comprises a MOSFET.

18. A battery pack as in claim 16 wherein said switch delay comprises a series resistor and a shunt capacitor.

19. A battery pack as in claim 16 wherein said driver switch comprises a MOSFET and a pull up resistor coupled in series between said positive charging terminal and said negative charging terminal.

20. A battery pack as in claim 14, wherein said temperature signal switch control means comprises:

a current sense circuit for providing a signal proportional to said charge current level through said at least one battery cell as an output signal; and a comparator circuit for comparing said signal provided by said current sense circuit with a reference voltage, said comparator circuit having an output coupled to said temperature signal switch means and providing an actuating signal if said signal provided by said current sense circuit is greater than said reference voltage.

21. A battery pack as in claim 20 wherein said current sense circuit comprises:

a current sense resistor connected in series with said at least one battery cell for producing a low level voltage signal proportional to said charge current level through said at least one battery cell; and an amplifier for amplifying said low level voltage signal by a preselected gain factor thereby providing an amplified signal to said comparator circuit.

22. A battery pack as in claim 21 wherein said amplifier is an op-amp connected in a non-inverting configuration.

23. A battery pack as in claim 20 wherein said comparator circuit comprises:

a comparator having an inverting input, non-inverting input, and a comparator output, said non-inverting input receiving said output signal of said current sense circuit; and a voltage reference connected between said inverting input of said comparator and said negative charging terminal.

24. A battery pack as in claim 14 wherein said temperature sensing element is a NTC thermistor.

25. A battery pack as in claim 14 wherein said temperature signal switch means comprises a MOSFET.

26. A battery pack as in claim 25 wherein said temperature signal switch means further comprises a current limiting resistor coupled in series with said MOSFET.

* * * * *